United States Patent
Chen

(10) Patent No.: US 9,172,985 B2
(45) Date of Patent: Oct. 27, 2015

(54) VIDEO PLAYBACK SYSTEM ALLOWING MULTIPLE MOBILE COMMUNICATION DEVICES TO CONTROL THE SAME VIDEO DECODER AND RELATED COMPUTER PROGRAM PRODUCTS

(71) Applicant: Gemtek Technology Co., Ltd., Hsinchu (TW)

(72) Inventor: Hung-Wen Chen, Hsinchu County (TW)

(73) Assignee: GEMTEK TECHNOLOGY CO., LTD., Hsinchu (TW)

( * ) Notice: Subject to any disclaimer, the term of this patent is extended or adjusted under 35 U.S.C. 154(b) by 34 days.

(21) Appl. No.: 13/870,307

(22) Filed: Apr. 25, 2013

(65) Prior Publication Data
US 2014/0165122 A1   Jun. 12, 2014

(30) Foreign Application Priority Data
Dec. 6, 2012   (TW) .............................. 101145816 A

(51) Int. Cl.
| | |
|---|---|
| H04N 7/173 | (2011.01) |
| H04N 21/254 | (2011.01) |
| H04N 21/462 | (2011.01) |
| H04N 21/2543 | (2011.01) |
| H04N 21/41 | (2011.01) |
| H04N 21/4227 | (2011.01) |
| H04N 21/472 | (2011.01) |
| H04N 21/6334 | (2011.01) |
| H04N 21/845 | (2011.01) |

(52) U.S. Cl.
CPC ....... *H04N 21/2541* (2013.01); *H04N 21/2543* (2013.01); *H04N 21/4126* (2013.01); *H04N 21/4227* (2013.01); *H04N 21/4622* (2013.01); *H04N 21/47217* (2013.01); *H04N 21/6334* (2013.01); *H04N 21/8456* (2013.01)

(58) Field of Classification Search
CPC .................................................. H04N 21/4462
USPC .......................................... 725/86, 105, 110
See application file for complete search history.

(56) References Cited

U.S. PATENT DOCUMENTS

| | | | |
|---|---|---|---|
| 8,014,768 B2 * | 9/2011 | Ackley ......................... | 455/420 |
| 2009/0313657 A1 * | 12/2009 | Britt et al. ....................... | 725/51 |
| 2011/0131599 A1 * | 6/2011 | Lee ................................. | 725/25 |

* cited by examiner

*Primary Examiner* — Olugbenga Idowu
(74) *Attorney, Agent, or Firm* — WPAT, PC; Justin King

(57) ABSTRACT

A video playback system includes a content provider server for providing video signals of a first and a second video; a video decoder; a display for displaying video content outputted from the video decoder; a playback control server for controlling the video decoder; a first mobile communication device for transmitting a first selection message to the playback control server via internet at a first time point; and a second mobile communication device for transmitting a second selection message to the playback control server via internet at a second time point. The playback control server utilizes the video decoder to receive video signals of the first video according to the first selection message, and utilizes the video decoder to receive video signals of the second video according to the second selection message after the second time point.

14 Claims, 5 Drawing Sheets

VIDEO PLAYBACK SYSTEM ALLOWING MULTIPLE MOBILE COMMUNICATION DEVICES TO CONTROL THE SAME VIDEO DECODER AND RELATED COMPUTER PROGRAM PRODUCTS

CROSS-REFERENCE TO RELATED APPLICATIONS

This application claims the benefit of priority to Patent Application No. 101145816, filed in Taiwan on Dec. 6, 2012; the entirety of which is incorporated herein by reference for all purposes.

BACKGROUND

The disclosure generally relates to a video playback system and, more particularly, to a video playback system allowing multiple mobile communication devices to control the same video decoder and related computer program products.

With the progress of internet, many video playback systems for transmitting content of videos through internet have been developed. In conventional applications, however, a content service provider only allots one remote control to each video decoder, such as a set-top box. Once the remote control is lost or damaged, the video decoder would be unable to be manipulated by the user.

Additionally, in the conventional video playback system where each video decoder is equipped with only a single remote control, protection passwords are typically configured for different video channels by the user in order to respectively set different video viewing authorities for different users (e.g., family members of different ages). For many users, however, it is troublesome to memorize and input the protection passwords, which usually causes inconvenience in watching videos.

SUMMARY

An example embodiment of a video playback system is disclosed, comprising: a content provider server, configured to operably provide video signals of a first video and a second video; a video decoder, configured to operably communicate with the content provider server via internet; a display, coupled with the video decoder and configured to operably display video content outputted from the video decoder; a playback control server, configured to operably control the video decoder via internet; a first mobile communication device, configured to operably transmit a first selection message to the playback control server via internet at a first time point; and a second mobile communication device, configured to operably transmit a second selection message to the playback control server via internet at a second time point; wherein the playback control server utilizes the video decoder to receive and decode video signals of the first video according to the first selection message, and after the second time point the playback control server utilizes the video decoder to receive and decode video signals of the second video according to the second selection message.

Another example embodiment of a computer program product is disclosed. The computer program product is stored in a non-transitory storage device of a playback control server. When the computer program product is executed by a processing circuit of the playback control server, the computer program product enables the playback control server to perform a video playback control operation. The video playback control operation comprises: receiving a first selection message transmitted from a first mobile communication device via internet at a first time point; utilizing a video decoder to receive and decode video signals of a first video transmitted from a content provider server according to the first selection message; receiving a second selection message transmitted from a second mobile communication device via internet at a second time point; and utilizing the video decoder to receive and decode video signals of a second video transmitted from the content provider server according to the second selection message after the second time point.

One of the advantages of the aforementioned embodiments is that different mobile communication devices are allowed to control the same video decoder, thereby effectively improving the convenience of manipulating the video decoder.

Another advantage of the aforementioned embodiments is that the mobile communication device is allowed to manipulate a video decoder in a remote distance through the playback control server, thereby greatly expanding functionality, applicability, and flexibility of the video playback system.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
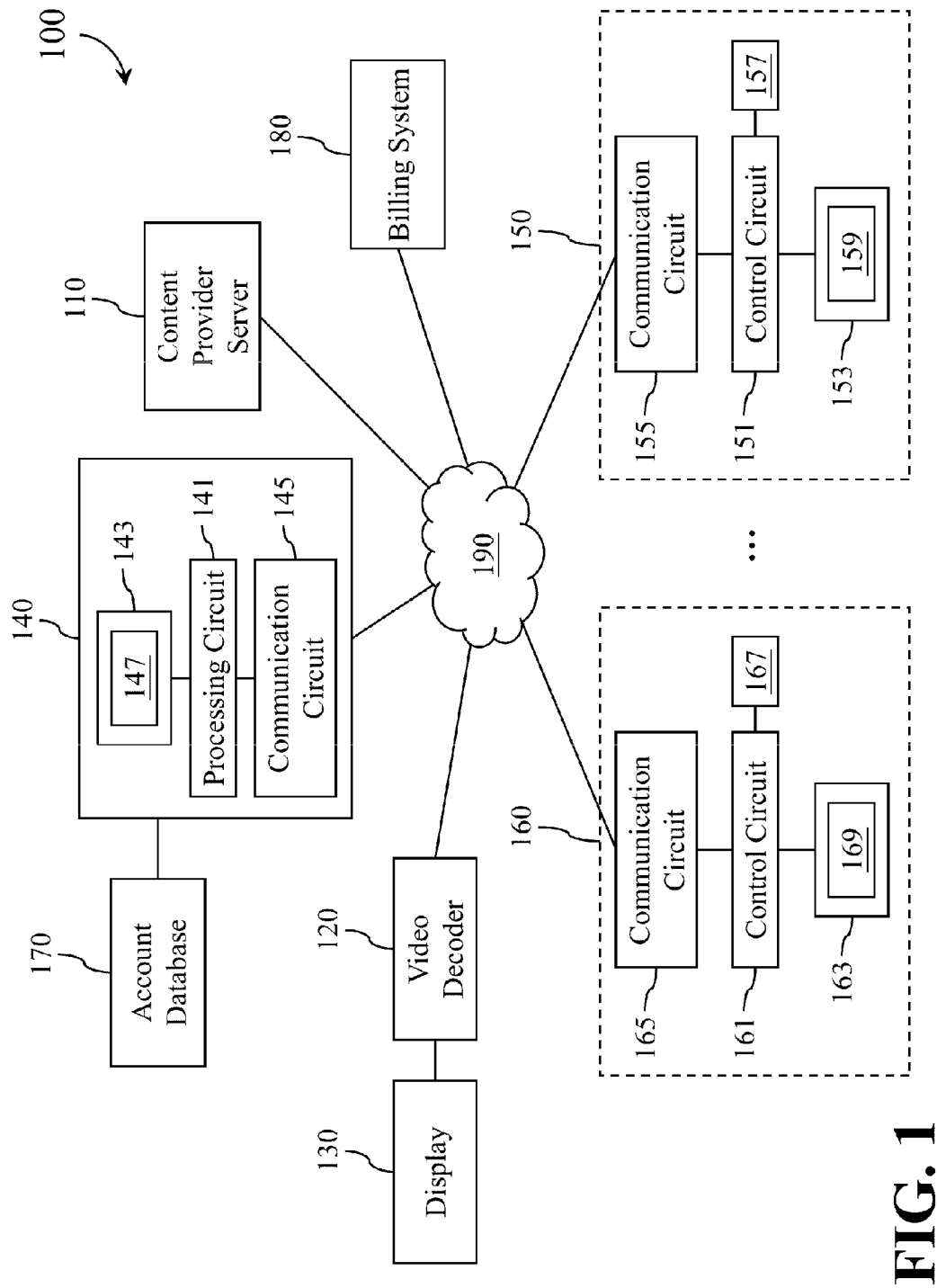
FIG. 1 shows a simplified functional block diagram of a video playback system according to one embodiment of the present disclosure.

Please refer to FIG. 1, which shows a simplified functional block diagram of a video playback system 100 according to one embodiment of the present disclosure. The video playback system 100 comprises a content provider server 110, a video decoder 120, a display 130, a playback control server 140, multiple mobile communication devices (e.g., the example mobile communication devices 150 and 160 shown in FIG. 1), an account database 170, and a billing system 180. In this embodiment, the content provider server 110, the video decoder 120, the mobile communication devices 150 and 160, and the billing system 180 communicate with the playback control server 140 via the internet 190.

The content provider server 110 is configured to operably provide video signals of a first video and a second video. The video decoder 120 is configured to operably communicate with the content provider server 110 via the internet 190 to receive the video signals transmitted from the content provider server 110. The display 130 is coupled with the video decoder 120 and configured to operably display video content outputted from the video decoder 120. The playback control server 140 is configured to operably control the video decoder 120 via the internet 190. The mobile communication devices 150 and 160 are configured to operably transmit control messages to the playback control server 140 via the internet 190 to request for a control right of the video decoder 120. The playback control server 140 is configured to dynamically assign the control right of the video decoder 120 to the mobile communication device 150 or 160. The mobile communication device having the control right of the video decoder 120 is allowed to transmit control messages to the playback control server 140 to select a target video to be playbacked.

In the video playback system 100, the mobile communication devices 150 and 160 act as remote controls of the video decoder 120, but the mobile communication devices 150 and 160 indirectly manipulate the video decoder 120 through the playback control server 140. Additionally, the video signal of the target video selected by the mobile communication device 150 or 160 is directly transmitted to the video decoder 120 from the content provider server 110 via the internet 190, and the playback control server 140 does not act as an intermediate device for the transmission of the video signals.

As shown in FIG. 1, the playback control server 140 comprises a processing circuit 141, a non-transitory storage device 143, and a communication circuit 145, wherein both the storage device 143 and the communication circuit 145 are coupled with the processing circuit 141. The storage device 143 is stored with a playback control module 147. In practice, the playback control module 147 may be realized with one or more application program modules, and the storage device 143 may be realized with a volatile memory or a nonvolatile memory. The processing circuit 141 may be realized with one or more processor units. The communication circuit 145 may be realized with a wired communication circuit, a wireless communication circuit, or a hybrid circuit integrated with the functionalities of the above two circuits. For the purpose of explanatory convenience, other components and connections in the playback control server 140 are not shown in FIG. 1. In practice, the playback control server 140 may be realized with multiple servers located in the same geographic region, or may be realized with multiple servers located in different geographic regions.

In the embodiment of FIG. 1, the mobile communication device 150 comprises a control circuit 151, a non-transitory storage device 153, a communication circuit 155, and an input device 157, wherein the storage device 153, the communication circuit 155, and the input device 157 are coupled with the control circuit 151. Similar to the mobile communication device 150, the mobile communication device 160 comprises a control circuit 161, a non-transitory storage device 163, a communication circuit 165, and an input device 167, wherein the storage device 163, the communication circuit 165, and the input device 167 are coupled with the control circuit 161. In practice, each of the control circuits 151 and 161 may be realized with one or more processor units. Each of the communication circuits 155 and 165 may be realized with a wired communication circuit, a wireless communication circuit, or a hybrid circuit integrated with the functionalities of the above two circuits. Each of the input devices 157 and 167 may be realized with a touch screen, a touch pad, a keyboard, a mouse, a voice control device, or various combinations of aforementioned devices. Additionally, the storage device 153 is stored with a video remote control module 159 realized with one or more application program modules, and the storage device 163 is stored with a video remote control module 169 realized with one or more application program modules.

In applications, each of the mobile communication devices 150 and 160 may be realized with any mobile electronic device having networking capability, such as a cell phone, a tablet computer, a notebook computer, a netbook computer, an E-book, or a handheld game console, or the like. For the purpose of explanatory convenience, other components and connections in each of the mobile communication devices 150 and 160 are not shown in FIG. 1.

The operations of the video playback system 100 will be further described in the following by reference to FIG. 2 and FIG. 3.

Figure 2:
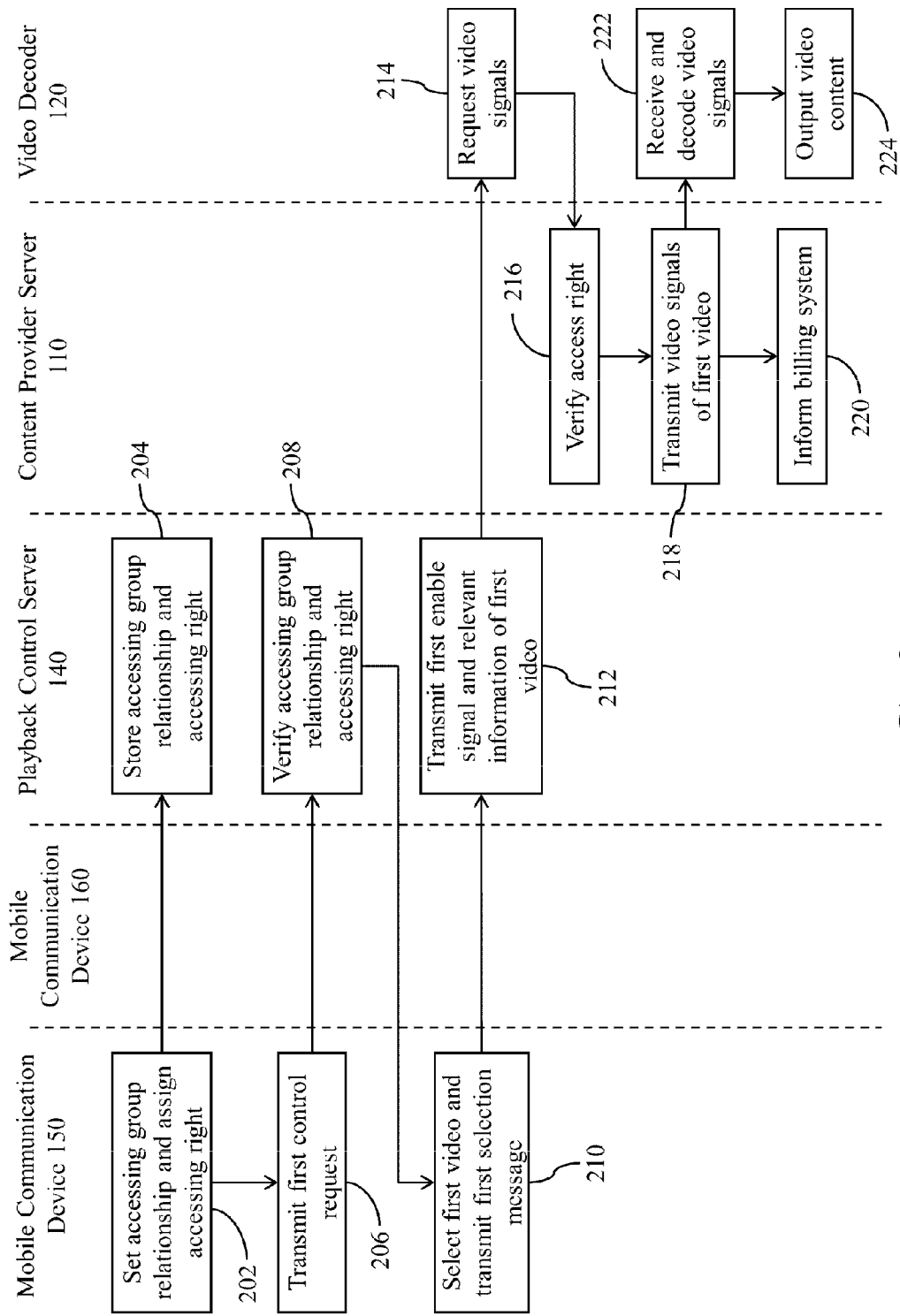
FIGS. 2~3 collectively show a simplified flowchart of a video playback control method according to a first embodiment of the present disclosure.
Figure 3:
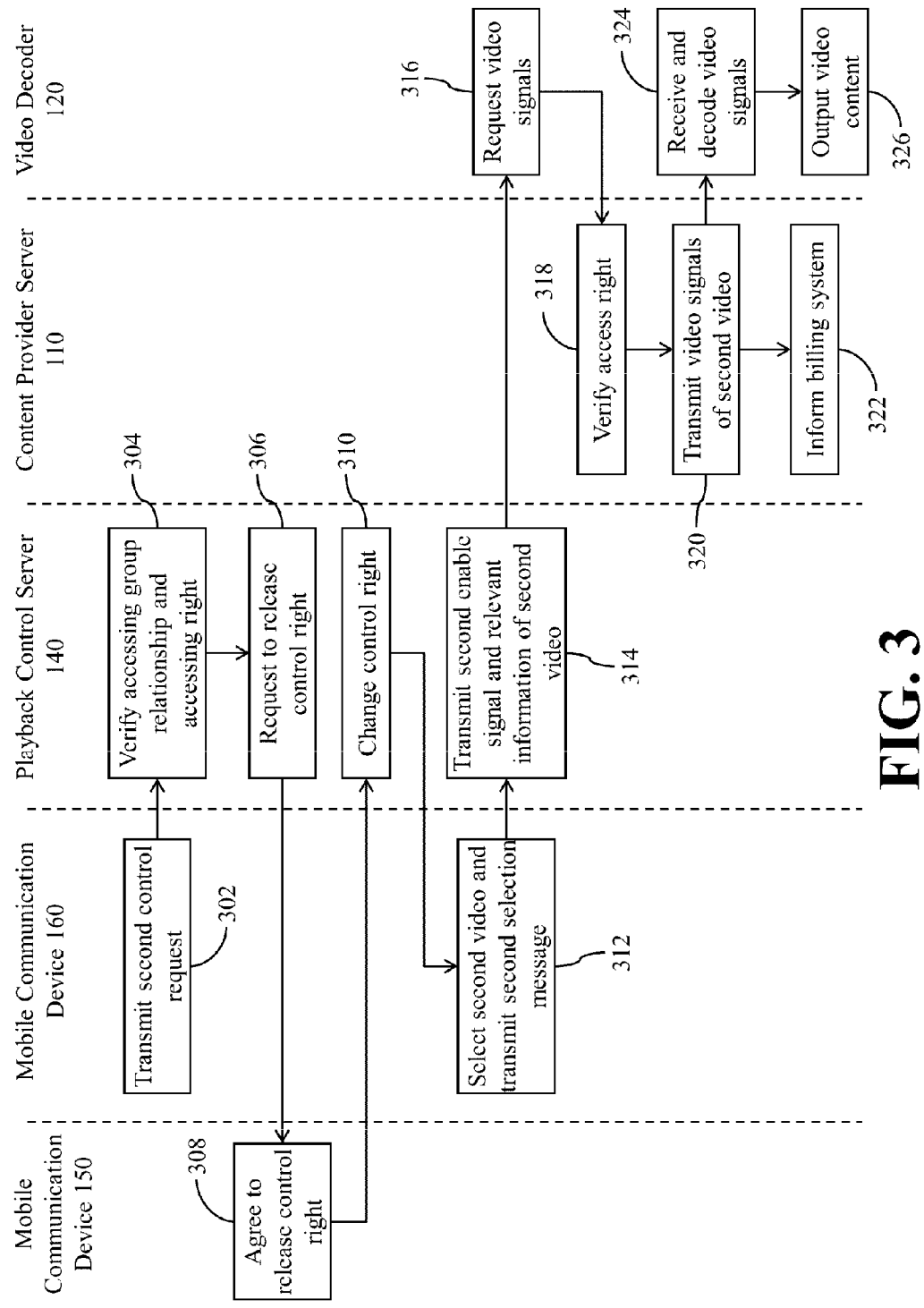

FIGS. 2~3 collectively show a simplified flowchart illustrating a video playback control method adopted by the video playback system 100 according to a first embodiment of the present disclosure. In FIGS. 2~3, operations within a column under the name of a specific device are operations to be performed by the specific device. For example, in FIG. 2, operations within a column under the label "playback control server 140" are operations to be performed by the playback control server 140, operations within a column under the label "video decoder 120" are operations to be performed by the video decoder 120, and so forth. The same analogous arrangement also applies to the subsequent flowcharts.

When the user of the mobile communication device 150 wants to watch a video, the user may utilize the input device 157 of the mobile communication device 150 to instruct the control circuit 151 to execute the video remote control module 159, so as to enable the mobile communication device 150 to perform some or all operations in the corresponding column in FIG. 2 and FIG. 3. Similarly, when the user of the mobile communication device 160 wants to watch a video, the user may utilize the input device 167 of the mobile communication device 160 to instruct the control circuit 161 to execute the video remote control module 169, so as to enable the mobile communication device 160 to perform some or all operations in the corresponding column in FIG. 2 and FIG. 3. The processing circuit 141 of the playback control server 140 executes the playback control module 147, so as to enable the playback control server 140 to perform some or all operations in the corresponding column.

In the operation 202, the video remote control module 159 of the mobile communication device 150 may set the mobile communication devices 150 and 160 as the same accessing group, and respectively assign different video accessing rights to the mobile communication devices 150 and 160. For example, the user of the mobile communication device 150 may be a parent of a family and the user of the mobile communication device 160 may be a child in the family. In this case, the video remote control module 159 may assign a higher video accessing right to the mobile communication device 150 and assign a lower accessing right to the mobile communication device 160 according to the user manipulation to the mobile communication device 150. Then, the video remote control module 159 may utilize the communication circuit 155 to transmit the settings of the accessing group relationship and the accessing right to the playback control server 140 via the internet 190. In practice, the aforementioned settings may comprise the SIM numbers of the mobile communication devices 150 and 160 and an accessing group ID.

When the settings of the accessing group relationship and the accessing right are received by the playback control server 140, the playback control server 140 performs the operation 204 to store the received settings of the accessing group relationship and the accessing right.

Afterward, when the user of the mobile communication device 150 wants to utilize the mobile communication device 150 to control the video decoder 120 via the playback control server 140, the video remote control module 159 performs the operation 206 to utilize the communication circuit 155 to transmit a first control request CR1 to the playback control server 140 through the internet 190.

When the playback control server 140 received the first control request CR1, the playback control server 140 performs the operation 208 to verify whether the mobile communication device 150 matches with the predetermined group relationship stored in the playback control server 140, and to verify the accessing right of the mobile communication device 150. In practice, the playback control server 140 may conduct an identity authentication procedure on the mobile communication device 150 in the operation 208. When performing the identity authentication procedure, the playback control server 140 may generate a related identity inquiring webpage to request the user of the mobile communication device 150 to input identification data (such as a cell phone number, a user alias, or a ID number) and a corresponding password. Then, the playback control server 140 may compare the identification data transmitted from the mobile communication device 150 with data stored in the account database 170. If the identification data transmitted from the mobile communication device 150 matches with the data stored in the account database 170, the playback control server 140 determines that the mobile communication device 150 passed the identity authentication procedure. Otherwise, the playback control server 140 returns a message indicating that the identity authentication is failed to the mobile communication device 150.

When the mobile communication device 150 passed the authentication procedure of the operation 208, the playback control server 140 assigns the control right of the video decoder 120 to the mobile communication device 150.

Then, the video remote control module 159 of the mobile communication device 150 performs the operation 210 to request the user to utilize the input device 157 to select a first video V1 to be playbacked. The video remote control module 159 utilizes the communication circuit 155 to transmit a first selection message containing a video ID or related identification data of the first video V1 to the playback control server 140 via the internet 190 at a first time point T1.

In the operation 212, the playback control module 147 of the playback control server 140 utilizes the communication circuit 145 to receive the first selection message transmitted from the mobile communication device 150. The playback control module 147 utilizes the video decoder 120 to receive video signals of the first video V1 according to the first selection message. Accordingly, in the operation 212, the playback control module 147 utilizes the communication circuit 145 to transmit a first enable signal EN1 and relevant information of the first video V1 to the video decoder 120 via the internet 190. In one embodiment, the aforementioned relevant information of the first video V1 comprises the video ID or related identification data of the first video V1. In another embodiment, the aforementioned relevant information of the first video V1 further comprises the purchaser information of the first video V1, such as the SIM number of the mobile communication device 150.

When the video decoder 120 received the first enable signal EN1 and the relevant information of the first video V1, the video decoder 120 performs the operation 214 to send a request to the content provider server 110 via the internet 190 to request the content provider server 110 to provide the video signals of the first video V1. In practice, when the video decoder 120 requests the content provider server 110 to provide the video signals of the first video V1, the video decoder 120 may transmit the aforementioned relevant information of the first video V1 to the content provider server 110.

In the operation 216, the content provider server 110 verifies the accessing right of the video decoder 120. For example, the content provider server 110 may inquire the playback control server 140 about whether the mobile communication device 150 corresponding to the video decoder 120 has purchased the first video V1. If the content provider server 110 ensures that the video decoder 120 has the accessing right of the first video V1, the content provider server 110 performs the operation 218 to transmit the video signals of the first video V1 to the video decoder 120 via the internet 190.

In the operation 220, the content provider server 110 informs the billing system 180 via the internet 190 of that the mobile communication device 150 has purchased the first video V1, so that the billing system 180 updates the billing records of the mobile communication device 150 accordingly.

In the operation 222, the video decoder 120 receives and decodes the video signals of the first video V1.

In the operation 224, the video decoder 120 outputs the decoded video content to the display 130 to display the first video V1.

While the video decoder 120 and the display 130 playback the first video V1, or after playbacking the first video V1, if the user of the mobile communication device 160 wants to watch a different second video V2, the video remote control module 169 may be utilized to perform the operation 302 in FIG. 3 to transmit a second control request CR2 to the playback control server 140 via the internet 190.

When the playback control module 147 received the second control request CR2 transmitted from the mobile communication device 160, the playback control module 147 performs the operation 304 to verify whether the mobile communication device 160 matches with the predetermined group relationship stored in the playback control server 140, and to verify the accessing right of the mobile communication device 160. In practice, the playback control server 140 may conduct an identity authentication procedure on the mobile communication device 160 in the operation 304. When performing the identity authentication procedure, the playback control server 140 may generate a related identity inquiring webpage to request the user of the mobile communication device 160 to input identification data (such as a cell phone number, a user alias, or a ID number) and a corresponding password. Then, the playback control server 140 may compare the identification data transmitted from the mobile communication device 160 with data stored in the account database 170. If the identification data transmitted from the mobile communication device 160 matches with the data stored in the account database 170, the playback control server 140 determines that the mobile communication device 160 passed the identity authentication procedure. Otherwise, the playback control server 140 returns a message indicating that the identity authentication is failed to the mobile communication device 160.

When the mobile communication device 160 passed the authentication procedure of the operation 304, the playback control module 147 of the playback control server 140 performs the operation 306 to send a request to the mobile communication device 150 via the internet 190 to request the mobile communication device 150 to release the control right of the video decoder 120.

If the user of the mobile communication device 150 agrees to release the control right of the video decoder 120, the video remote control module 159 performs the operation 308 to transmit a confirmation message to the playback control server 140 via the internet 190 so as to inform the playback control server 140 of that the mobile communication device 150 agrees to release the control right of the video decoder 120.

In the operation 310, the playback control module 147 changes the control right of the video decoder 120, and assigns the control right of the video decoder 120 to the mobile communication device 160.

Then, the video remote control module 169 of the mobile communication device 160 performs the operation 312 to request the user to utilize the input device 167 to select a second video V2 to be playbacked. The video remote control module 169 utilizes the communication circuit 165 to transmit a second selection message containing a video ID or related identification data of the second video V2 to the playback control server 140 via the internet 190 at a second time point T2.

In the operation 314, the playback control module 147 of the playback control server 140 utilizes the communication circuit 145 to receive the second selection message transmitted from the mobile communication device 160. The playback control module 147 utilizes the video decoder 120 to receive the video signals of the second video V2 according to the second selection message. Accordingly, in the operation 314, the playback control module 147 utilizes the communication circuit 145 to transmit a second enable signal EN2 and relevant information of the second video V2 to the video decoder 120 via the internet 190. In one embodiment, the aforementioned relevant information of the second video V2 comprises the video ID or related identification data of the second video V2. In another embodiment, the aforementioned relevant information of the second video V2 further comprises the purchaser information of the second video V2, such as the SIM number of the mobile communication device 160.

When the video decoder 120 received the second enable signal EN2 and the relevant information of the second video V2, the video decoder 120 performs the operation 316 to send a request to the content provider server 110 via the internet 190 to request the content provider server 110 to provide the video signals of the second video V2. In practice, when the video decoder 120 requests the content provider server 110 to provide the video signals of the second video V2, the video decoder 120 may transmit the aforementioned relevant information of the second video V2 to the content provider server 110.

In the operation 318, the content provider server 110 verifies the accessing right of the video decoder 120. For example, the content provider server 110 may inquire the playback control server 140 about whether the mobile communication device 160 corresponding to the video decoder 120 has purchased the second video V2. If the content provider server 110 ensures that the video decoder 120 has the accessing right of the second video V2, the content provider server 110 performs the operation 320 to transmit the video signals of the second video V2 to the video decoder 120 via the internet 190.

In the operation 322, the content provider server 110 informs the billing system 180 via the internet 190 of that the mobile communication device 160 has purchased the second video V2, so that the billing system 180 updates the billing records of the mobile communication device 160 accordingly. In practical applications, the billing system 180 may separately charge the purchasing of the first video V1 made by the mobile communication device 150 from the purchasing of the second video V2 made by the mobile communication device 160. For example, the billing system 180 may charge for the first video V1 on the telecommunication bill of the mobile communication device 150 and charge for the second video V2 on the telecommunication bill of the mobile communication device 160. This approach clearly separates the fee generated by the purchasing behavior of one user from the fee generated by the purchasing behavior of another user, and would not cause confusion in the billing procedure.

In the operation 324, the video decoder 120 receives and decodes the video signals of the second video V2.

In the operation 326, the video decoder 120 outputs the decoded video content to the display 130 to playback the second video V2.

As described previously, the billing system 180 may separately charge the purchasing of the first video V1 made by the mobile communication device 150 from the purchasing of the second video V2 made by the mobile communication device 160. In one embodiment, even if the mobile communication device 160 purchases the first video V1 just after a short period (e.g., couple hours) since the mobile communication device 150 purchased the first video V1, the billing system 180 may still separately charge the purchasing of the first video V1 made by the mobile communication device 150 from the purchasing of the first video V1 made by the mobile communication device 160. This approach is especially suitable for the applications where the leaseholders of multiple rooms share the same video decoder 120 and display 130 to playback videos on a timeshare basis.

It can be appreciated from the foregoing descriptions that the mobile communication devices 150 and 160 in the video playback system 100 are enabled to indirectly control the video decoder 120 through the playback control server 140. The mobile communication devices 150 and 160 communicate with the playback control server 140 via the internet 190, and the playback control server 140 communicates with the video decoder 120 via the internet 190. Accordingly, the users of the mobile communication devices 150 and 160 are enabled to manipulate the video decoder 120 even if the mobile communication devices 150 and 160 are located far away from the video decoder 120. As a result, the applications and the operational flexibility of the video playback system 100 can be effectively increased.

Additionally, the video playback system 100 allows the same video decoder 120 to be controlled by different communication devices. Accordingly, the video decoder 120 can still be manipulated even if its remote control is lost or damaged. In addition, viewing control mechanism among different communication devices can be easily achieved.

Figure 4:
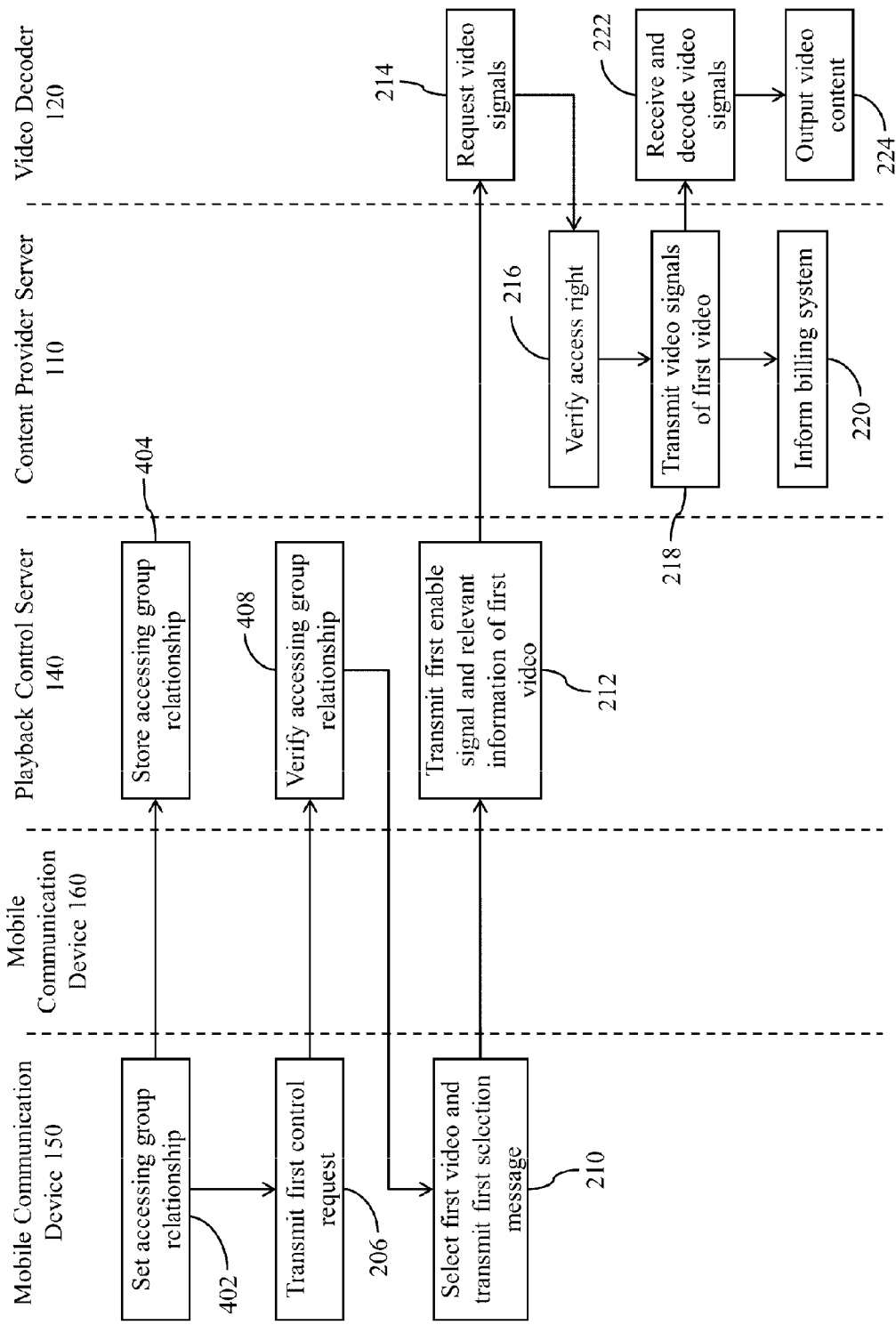
FIGS. 4~5 collectively show a simplified flowchart of a video playback control method according to a second embodiment of the present disclosure.
Figure 5:
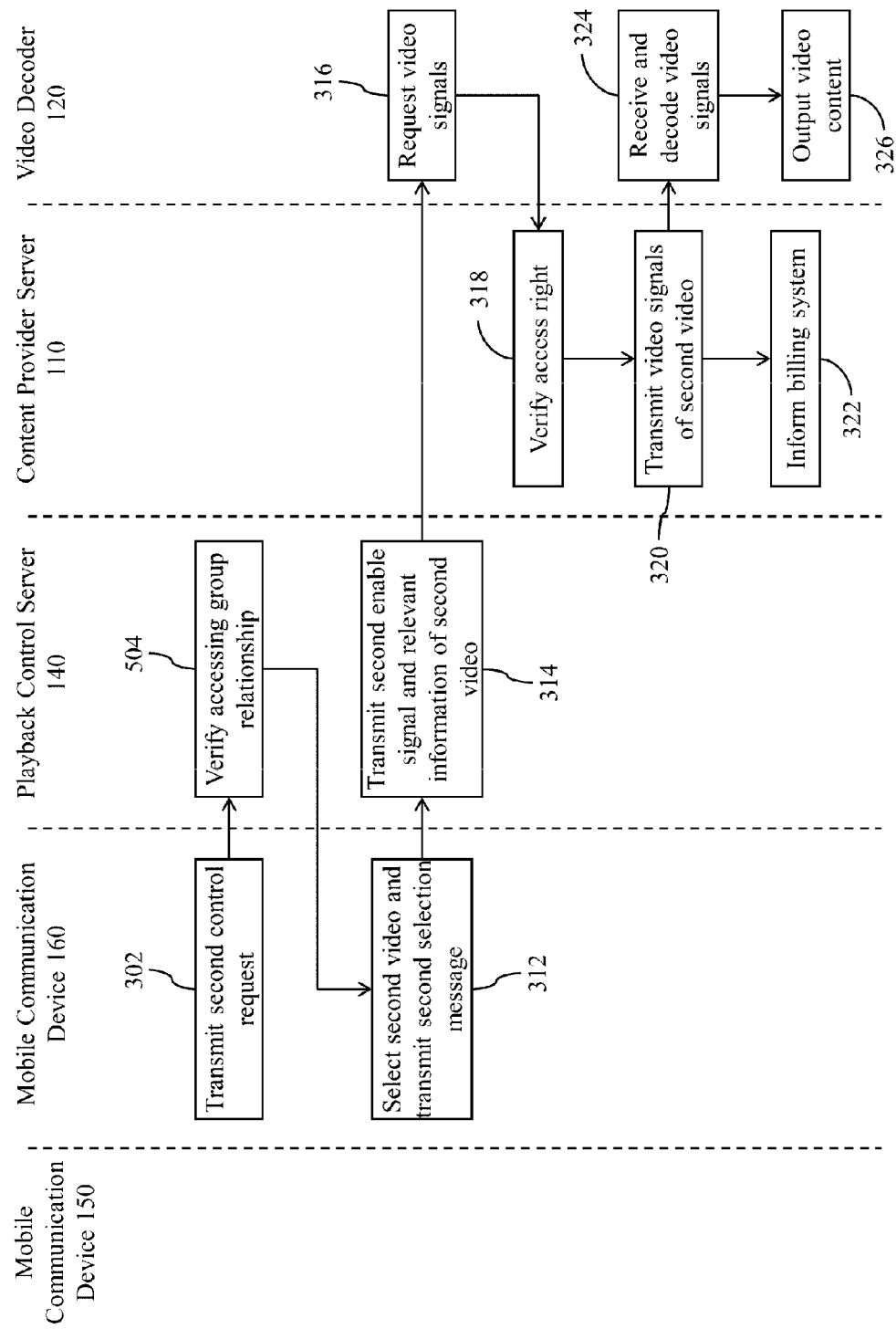

Please refer to FIG. 4 and FIG. 5, which collectively show a simplified flowchart illustrating a video playback control method adopted by the video playback system 100 according to a first embodiment of the present disclosure.

The flowchart in FIG. 4 is similar to the flowchart in FIG. 2, but the operations 202, 204, and 208 in FIG. 2 are replaced by the operations 402, 404, and 408 in FIG. 4.

In the embodiment of FIG. 4, the video remote control module 159 of the mobile communication device 150 may set the mobile communication devices 150 and 160 as the same accessing group in the operation 402, but does not assign different video accessing rights to the mobile communication devices 150 and 160. The video remote control module 159 may utilize the communication circuit 155 to transmit the setting of the accessing group relationship to the playback control server 140 via the internet 190. In practice, the aforementioned setting may comprise the SIM numbers of the mobile communication devices 150 and 160 and an accessing group ID.

When the setting of the accessing group relationship is received by the playback control server 140, the playback control server 140 performs the operation 404 to store the received setting of the accessing group relationship.

In the embodiment of FIG. 4, when the playback control server 140 received the first control request CR1, the playback control server 140 performs the operation 408 to verify whether the mobile communication device 150 matches with the predetermined group relationship stored in the playback control server 140. Similarly, the playback control server 140 may conduct an identity authentication procedure identical or similar to the previous embodiments on the mobile communication device 150 in the operation 408.

When the mobile communication device 150 passed the authentication procedure of the operation 408, the playback control server 140 assigns the control right of the video decoder 120 to the mobile communication device 150.

Then, the video remote control module 159 of the mobile communication device 150 performs the operation 210 to request the user to utilize the input device 157 to select a first video V1 to be playbacked. The video remote control module 159 utilizes the communication circuit 155 to transmit a first selection message containing a video ID or related identification data of the first video V1 to the playback control server 140 via the internet 190 at a first time point T1.

Other operations in FIG. 4 are the same as those corresponding operations in FIG. 2. Accordingly, the descriptions regarding the implementations and advantages of the other operations in FIG. 2 are also applicable to the embodiment of FIG. 4.

As shown in FIG. 5, when the playback control module 147 received the second control request CR2 transmitted from the mobile communication device 160, the playback control module 147 performs the operation 504 to verify whether the mobile communication device 160 matches with the predetermined group relationship stored in the playback control server 140. In this embodiment, the playback control module 147 does not need to verify the accessing right of the mobile communication device 160. In practice, the playback control server 140 may conduct an identity authentication procedure identical or similar to the previous embodiments on the mobile communication device 160 in the operation 504.

When the mobile communication device 160 passed the authentication procedure of the operation 504, the playback control module 147 of the playback control server 140 assigns the control right of the video decoder 120 to the mobile communication device 160.

Then, the video remote control module 169 of the mobile communication device 160 performs the operation 312 to request the user to utilize the input device 167 to select a second video V2 to be playbacked. The video remote control module 169 utilizes the communication circuit 165 to transmit a second selection message containing a video ID or related identification data of the second video V2 to the playback control server 140 via the internet 190 at a second time point T2.

Other operations in FIG. 5 are the same as those corresponding operations in FIG. 3. Accordingly, the descriptions regarding the implementations and advantages of the other operations in FIG. 3 are also applicable to the embodiment of FIG. 5.

As it can be appreciated from the foregoing descriptions that the method illustrated in FIG. 4 and FIG. 5 allows both the mobile communication devices 150 and 160 to control the video decoder 120. In addition, when the playback control server 140 in this embodiment wants to switch the control right of the video decoder 120, the playback control server 140 does not need to request the mobile communication device currently having the control right to release the control right, thereby effectively increasing the utilization convenience of the mobile communication devices 150 and 160 when they are utilized as the remote controls of the video decoder 120.

The executing order of the operations in the foregoing flowcharts is merely an exemplary example, rather than a restriction to the practical implementations. For example, in the embodiment of FIG. 2, the operation 206 and the operation 210 may be performed simultaneously, and the operation 208 may be adjusted to between the operations 210 and 212. In the embodiment of FIG. 3, the operation 302 and the operation 312 may be performed simultaneously, and the operation 304 may be adjusted to between the operations 312 and 314. In the embodiment of FIG. 4, the operation 206 and the operation 210 may be performed simultaneously, and the operation 408 may be adjusted to between the operations 210 and 212. In the embodiment of FIG. 5, the operation 302 and the operation 312 may be performed simultaneously, and the operation 504 may be adjusted to between the operations 312 and 314.

In addition, the aforementioned operations 220 and 322 may be instead performed by the playback control server 140. Furthermore, in some embodiments, the operations 306, 308, and 310 in FIG. 3 may be omitted.

It can be appreciated from the foregoing descriptions that the proposed the video playback system 100 enables multiple mobile communication devices to indirectly control the same video decoder 120 via the playback control server 140, so that the manipulation convenience and operational flexibility of the video decoder 120 can be effectively increased and viewing control for different users can be easily achieved. In addition, the video playback system 100 is capable of clearly separating the fee of the purchasing of a video made by one user from the fee of the purchasing of the same or a different video made by another user, and would not cause confusion in the billing procedure.

In addition, as described previously, the users of the mobile communication devices 150 and 160 in the video playback system 100 are enabled to manipulate the video decoder 120 even if the mobile communication devices 150 and 160 are located far away from the video decoder 120. Accordingly, the users of the mobile communication devices 150 and 160 not only allowed to utilize the mobile communication devices 150 and 160 to control the video decoder 120 to playback a video of interest to be watched, but also allowed to remote control the video decoder 120 to playback a selected video to others, such as their family or friends in a remote distance, thereby greatly extending the functionalities and applications of the video playback system 100.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A video playback system, comprising:
   a content provider server, configured to operably provide video signals of a first video and a second video;
   a video decoder, configured to operably communicate with the content provider server via internet;
   a display, coupled with the video decoder and configured to operably display video content outputted from the video decoder;
   a playback control server, configured to operably control the video decoder via internet;
   a first mobile communication device, configured to operably transmit a first selection message to the playback control server via internet at a first time point and the first selection message comprising a first control request;
   a second mobile communication device, configured to operably transmit a second selection message to the playback control server via internet at a second time point and the second selection message comprising a second control request, wherein the first time point is before the second time point; and
   a billing system, to operably update billing records of the first mobile communication device and the second mobile communication device;
   wherein when the playback control server receives the first control request at the first time point, the playback control server verifies whether the first mobile communication device matches with a predetermined group relationship, if the first mobile communication device matches with the predetermined group relationship, the playback control server gives a control right of the video decoder to the first mobile communication device and then utilizes the video decoder to receive and decode video signals of the first video according to the first selection message and an accessing right of the first mobile communication device;
   wherein when the playback server receives the second control request after the second time point, the playback control server verifies whether the second mobile communication device matches with the predetermined group relationship, if the second mobile communication device matches with the predetermined group relationship, the playback control server gives the control right of the video decoder to the second mobile communication device and then utilizes the video decoder to receive and decode video signals of the second video according to the second selection message and an accessing right of the second mobile communication device;
   wherein the content provider server informs the billing system of a first purchase of the first video by the first mobile communication device and a second purchase of the second video by the second mobile communication device via the internet; and
   wherein the billing system charge the first purchase of the first video made by the first mobile communication device and the second purchase of the second video made by the second mobile communication device separately.

2. The video playback system of claim 1,
   wherein the second mobile communication device transmits a second control request to the playback control server via internet before the second time point;
   wherein when the playback control server received the second control request the playback control server verifies whether the second mobile communication device matches with the predetermined group relationship.

3. The video playback system of claim 2, wherein when received the second control request, the playback control server requests the first mobile communication device to release a control right of the video decoder.

4. The video playback system of claim 1, wherein the second selection message comprises a second control request, and when the playback control server received the second control request the playback control server verifies whether the second mobile communication device matches with the predetermined group relationship.

5. The video playback system of claim 4, wherein when received the second control request, the playback control server requests the first mobile communication device to release a control right of the video decoder.

6. The video playback system of claim 1,
   wherein the playback control server transmits a first enable signal and relevant information of the first video to the video decoder after the first time point;
   wherein when received the first enable signal, the video decoder requests the content provider server to provide the video signals of the first video.

7. The video playback system of claim 6,
   wherein the playback control server transmits a second enable signal and relevant information of the second video to the video decoder after the second time point;
   wherein when received the second enable signal, the video decoder requests the content provider server to provide the video signals of the second video.

8. A computer program product, stored in a non-transitory storage device of a playback control server, when executed by a processing circuit of the playback control server, enabling the playback control server to perform a video playback control operation, the video playback control operation comprising:
   receiving a first selection message transmitted from a first mobile communication device via internet at a first time point, wherein the first selection message comprises a first control request, when the playback control server receives the first control request at the first time point, the playback control server verifies whether the first mobile communication device matches with a predetermined group relationship;
   utilizing a video decoder to receive and decode video signals of a first video transmitted from a content provider server according to the first selection message after the playback control server gives a control right of a video decoder to the first mobile communication device if the first mobile communication device matches with the predetermined group relationship;
   receiving a second selection message transmitted from a second mobile communication device via internet at a second time point, wherein the first time point is before the second time point;
   verifying whether the second mobile communication device matches with the predetermined group relationship, if the first mobile communication device matches with the predetermined group relationship, the playback control server gives the control right of the video decoder to the second mobile communication device; and
   utilizing the video decoder to receive and decode video signals of a second video transmitted from the content provider server according to the second selection message after the second time point;

wherein the content provider server informs a billing system of a first purchase of the first video by the first mobile communication device and a second purchase of the second video by the second mobile communication device via the internet; and wherein the first purchase of the first video made by the first mobile communication device and the second purchase of the second video made by the second mobile communication device are charged separately by the billing system.

9. The computer program product of claim 8, wherein the video playback control operation further comprises:

receiving a second control request transmitted from the second mobile communication device via internet before the second time point; and verifying whether the second mobile communication device matches with the predetermined group relationship.

10. The computer program product of claim 9, wherein the video playback control operation further comprises: when received the second control request, requesting the first mobile communication device to release a control right of the video decoder.

11. The computer program product of claim 8, wherein the second selection message comprises a second control request, and the video playback control operation further comprises:

verifying whether the second mobile communication device matches with the predetermined group relationship when received the second control request.

12. The computer program product of claim 11, wherein the video playback control operation further comprises: when received the second control request, requesting the first mobile communication device to release a control right of the video decoder.

13. The computer program product of claim 8, wherein the video playback control operation further comprises:

transmitting a first enable signal and relevant information of the first video to the video decoder after the first time point, so that the video decoder requests the content provider server to provide the video signals of the first video.

14. The computer program product of claim 13, wherein the video playback control operation further comprises: transmitting a second enable signal and relevant information of the second video to the video decoder after the second time point, so that the video decoder requests the content provider server to provide the video signals of the second video.

\* \* \* \* \*